United States Patent
Whiffen et al.

(12)

(10) Patent No.: US 12,150,472 B2
(45) Date of Patent: Nov. 26, 2024

(54) CONVEYOR AND METHOD FOR CONVEYING STRANDS OF AEROSOL-GENERATING MATERIAL, AND APPARATUS AND METHOD FOR PRODUCING A ROD OF AEROSOL-GENERATING MATERIAL

(71) Applicant: British American Tobacco (Investments) Limited, London (GB)

(72) Inventors: Sam Whiffen, London (GB); Andrew Jonathan Bray, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 225 days.

(21) Appl. No.: 17/414,670

(22) PCT Filed: Dec. 11, 2019

(86) PCT No.: PCT/GB2019/053501
§ 371 (c)(1),
(2) Date: Jun. 16, 2021

(87) PCT Pub. No.: WO2020/141297
PCT Pub. Date: Jul. 9, 2020

(65) Prior Publication Data
US 2022/0015410 A1 Jan. 20, 2022

(30) Foreign Application Priority Data

Jan. 4, 2019 (GB) .................................... 1900139

(51) Int. Cl.
*A24C 5/01* (2020.01)
*A24B 3/14* (2006.01)
(Continued)

(52) U.S. Cl.
CPC .................. *A24C 5/01* (2020.01); *A24B 3/14* (2013.01); *A24C 5/1807* (2013.01);
(Continued)

(58) Field of Classification Search
CPC ....... A24C 5/01; A24C 5/1807; A24C 5/1828; A24C 5/1857; A24C 5/392; A24B 3/14
See application file for complete search history.

(56) References Cited

U.S. PATENT DOCUMENTS 3,472,236 A 10/1969 Dearsley
3,589,373 A * 6/1971 Hooper ................ A24C 5/1828
131/78

(Continued)

FOREIGN PATENT DOCUMENTS

EP 1250855 A1 * 10/2002 ............... A24C 5/18
GB 1279724 6/1972
(Continued)

OTHER PUBLICATIONS

International Search Report for corresponding application PCT/GB2019/053501 filed Dec. 11, 2019; Mail date Mar. 5, 2020.
(Continued)

*Primary Examiner* — Christopher M Rodd
*Assistant Examiner* — Ronnie Kirby Jordan
(74) *Attorney, Agent, or Firm* — CANTOR COLBURN LLP

(57) ABSTRACT

A conveyor for conveying strands of aerosol-generating material is disclosed. The conveyor comprises a conveying surface, comprising a plurality of openings, on which the strands of aerosol-generating material are conveyed, and an air flow generator for generating a flow of air through the plurality of openings in the conveying surface to provide an air cushion between the conveying surface and the strands of aerosol-generating material. Apparatus for producing a rod
(Continued)

of aerosol-generating material comprising a slitting unit arranged to slit a web of aerosol-generating material into a plurality of strands of aerosol-generating material that are received by the conveyor is also disclosed, as well as a method of conveying strands of aerosol-generating material.

20 Claims, 8 Drawing Sheets

(51) Int. Cl.
*A24C 5/18* (2006.01)
*A24C 5/39* (2006.01)

(52) U.S. Cl.
CPC .......... *A24C 5/1828* (2013.01); *A24C 5/1857* (2013.01); *A24C 5/392* (2013.01)

(56) References Cited

U.S. PATENT DOCUMENTS

| | | | | |
|---|---|---|---|---|
| 3,645,273 A | | 2/1972 | Richter | |
| 4,047,536 A | | 9/1977 | Asfour | |
| 4,403,533 A | * | 9/1983 | Cox et al. | B26D 1/20 83/56 |
| 4,579,293 A | | 4/1986 | Steiniger | |
| 4,605,013 A | | 8/1986 | Goldbach | |
| 5,018,535 A | | 5/1991 | Da Silva | |
| 5,060,665 A | * | 10/1991 | Heitmann | A24C 5/14 134/84.1 |
| 5,649,551 A | | 7/1997 | Bottger | |
| 6,705,325 B1 | | 3/2004 | Hicks | |
| 6,807,969 B1 | | 10/2004 | Wessinger | |
| 2002/0185143 A1 | | 12/2002 | Crooks | |
| 2017/0233210 A1 | | 8/2017 | Kummel | |
| 2018/0064160 A1 | | 3/2018 | Gindrat | |

FOREIGN PATENT DOCUMENTS

| | | |
|---|---|---|
| WO | 2015173275 A1 | 11/2015 |
| WO | 2018211116 A1 | 11/2018 |
| WO | 2018229087 A1 | 12/2018 |

OTHER PUBLICATIONS

International Search Report for corresponding application PCT/GB2019/053513 filed Dec. 11, 2019; Mail date Mar. 6, 2020.

Written Opinion of the International Searching Authority for corresponding application PCT/GB2019/053501 filed Dec. 11, 2019; Mail date Mar. 5, 2020.

Written Opinion of the International Searching Authority for corresponding application PCT/GB2019/053513 filed Dec. 11, 2019; Mail date Mar. 6, 2020.

* cited by examiner

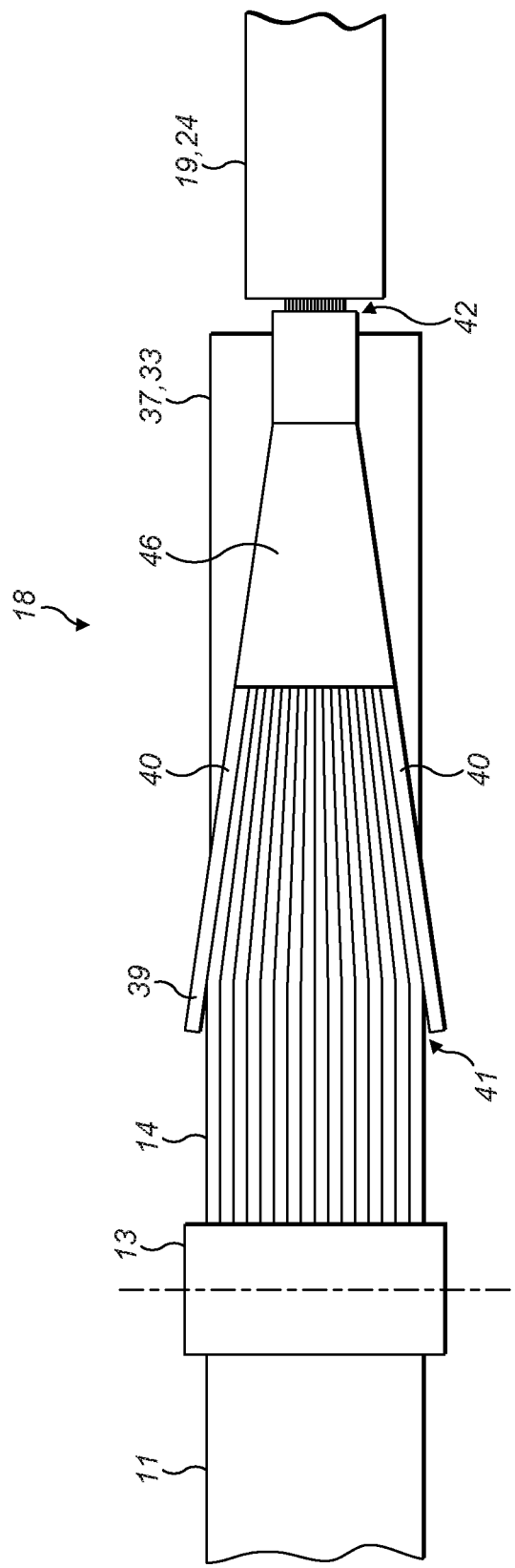

CONVEYOR AND METHOD FOR CONVEYING STRANDS OF AEROSOL-GENERATING MATERIAL, AND APPARATUS AND METHOD FOR PRODUCING A ROD OF AEROSOL-GENERATING MATERIAL

FIELD

The present invention relates to conveying strands of aerosol-generating material, and producing a rod of aerosol-generating material.

BACKGROUND

In a known process of manufacturing cigarettes, tobacco leaves are shredded into short fine strips, also referred to as cut rag tobacco. The shredded tobacco is then dispersed over a continuous web of cigarette paper. A machine, also known as a cigarette maker, folds the paper around the shredded tobacco to form a continuous rod. The rod is cut into segments of desired length. A filter is added to each tobacco rod segment to produce the cigarette.

Smoking articles such as cigarettes, cigars and the like burn tobacco during use to create tobacco smoke. Attempts have been made to provide alternatives to these articles by creating products that release compounds from tobacco or other materials without combusting. Examples of such products are so-called "heat not burn" products or tobacco heating devices or products or aerosol-generating devices or products, which release compounds by heating, but not burning, material, such as tobacco.

SUMMARY

According to a first aspect of the invention, there is provided a conveyor for conveying strands of aerosol-generating material, the conveyor comprising:
  a conveying surface on which the strands of aerosol-generating material are conveyed, the conveying surface comprising a plurality of openings; and,
  an air flow generator for generating a flow of air through the plurality of openings in the conveying surface to provide an air cushion between the conveying surface and the strands of aerosol-generating material.

The conveyor of claim 1 may further comprise a guide arranged to group together the strands of aerosol-generating material as the strands of aerosol-generating material are conveyed on the conveying surface.

The guide may comprise a pair of rails angled towards each other to group together the strands of aerosol-generating material as the strands of aerosol-generating material are conveyed on the conveying surface.

Each of the pair of rails comprises a guiding surface that engages the strands of aerosol-generating material.

The guiding surface of each rail may comprise a flat surface.

The guiding surface of each rail may comprise a curved surface, such that the pair of rails define a channel through which the strands of aerosol-generating material are conveyed.

The guiding surface of each rail may comprise a flat surface at an upstream end of the conveying surface, and a curved surface at a downstream end of the conveying surface.

The curved surfaces of the pair of rails may define a curved channel through which the strands of aerosol-generating material are conveyed.

The conveying surface may be a stationary surface.

The conveyor may comprise a box having an upper surface that defines the conveying surface, the box defining a chamber for air flow.

The conveyor may further comprise a belt conveyor, and wherein the conveying surface is a surface of the belt conveyor.

The conveyor may comprise a pair of rollers and a perforated belt being driveable on the rollers, the perforated belt comprising a plurality of openings and the conveying surface.

The conveyor may further comprising a pair of forming rollers between which the strands of aerosol-generating material pass.

The forming rollers may comprise concave forming surfaces.

The forming rollers may be disposed at the downstream end of the conveyor.

The aerosol-generating material may comprise tobacco.

The aerosol-generating material may comprise reconstituted tobacco.

According to another aspect of the invention, there is provided apparatus for producing a rod of aerosol-generating material, the apparatus comprising a slitting unit arranged to slit a web of aerosol-generating material into a plurality of strands of aerosol-generating material, and the conveyor of any preceding claim arranged to receive the strands of aerosol-generating material from the slitting unit.

The conveyor may be arranged to receive the strands of aerosol-generating material directly from the slitting unit.

The apparatus may further comprise a suction conveyor arranged to receive the strands of aerosol-generating material from the conveyor.

The suction conveyor may comprise a suction belt having an upper run and a lower run, the suction belt being arranged to convey the strands of aerosol-generating material on a lower run of the suction belt.

The apparatus may further comprise a garniture configured to wrap a wrapper about the strands of aerosol-generating material to form a rod of aerosol-generating material.

The garniture may be arranged on the suction conveyor.

The apparatus may further comprise a cutting unit arranged to cut the rod of aerosol-generating material into discrete rods of aerosol-generating material.

The aerosol-generating material may comprise tobacco.

The aerosol-generating material may comprise reconstituted tobacco.

According to another aspect of the invention, there is provided a method of conveying strands of aerosol-generating material, the method comprising:
  conveying strands of aerosol-generating material on a conveying surface, the conveying surface comprising a plurality of holes; and,
  generating a flow of air through the plurality of holes in the conveying surface to provide an air cushion between the conveying surface and the strands of aerosol-generating material.

The method may further comprise grouping together the strands of aerosol-generating material as they are conveyed on the conveying surface.

According to another aspect of the invention, there is provided a method of producing a rod of aerosol-generating material, the method comprising:

slitting a web of aerosol-generating material into a plurality of strands of aerosol-generating material; and,
conveying strands of aerosol-generating material according to the method of the invention.

The method may further comprise grouping together the strands of aerosol-generating material as they are conveyed over the conveying surface.

The method may further comprise wrapping the grouped strands of aerosol-generating material to form a rod of aerosol-generating material.

The method may further comprise cutting the rod of aerosol-generating material into discrete rods of aerosol-generating material.

The aerosol-generating material may comprise tobacco.

The aerosol-generating material may comprise reconstituted tobacco.

BRIEF DESCRIPTION OF THE DRAWINGS

Embodiments will now be described, by way of example only, with reference to the accompanying drawings, in which:

FIG. 6 shows an example guide for the conveyor of the apparatus of FIG. 2;

DETAILED DESCRIPTION

Figure 1A:
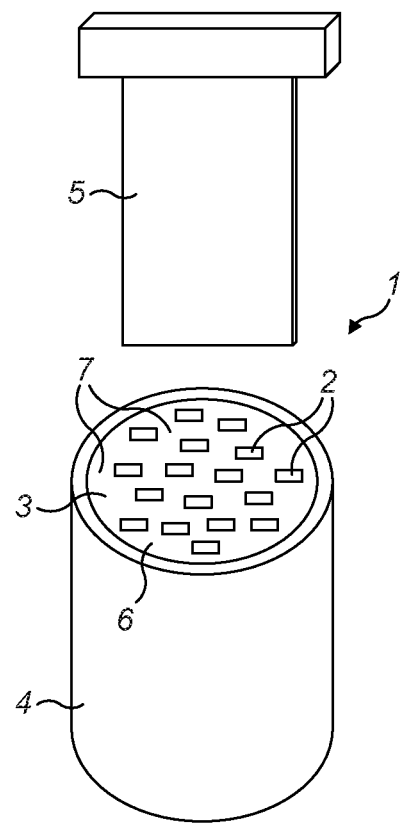
FIGS. 1A and 1B show a tobacco rod segment and a part of an aerosol-generating device, specifically a heating blade.
Figure 1B:
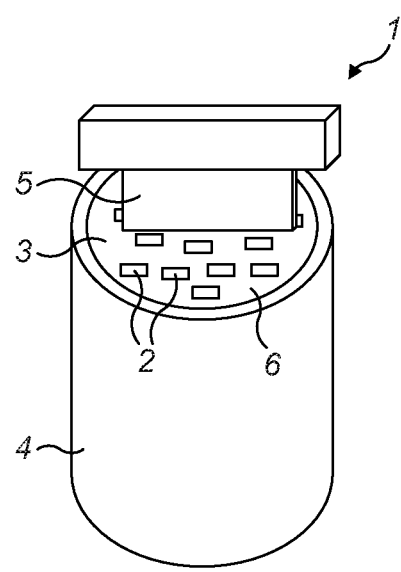

The apparatus described herein is for producing rods of aerosol-generating material. In examples, the rods of aerosol-generating material are tobacco rod segments 1, as shown in FIGS. 1A and 1B. The tobacco rod segments 1 are formed of a plurality of tobacco strands 2 that extend longitudinally along a tobacco rod 3 of the tobacco rod segment 1. The tobacco rod segment 1 also includes a wrapper 4 that circumscribes the tobacco rod 3.

The tobacco strands 2 are preferably formed from a sheet of tobacco material, for example a sheet of reconstituted tobacco. The sheet of reconstituted tobacco can be slit into a plurality of tobacco strands 2 for incorporation into a tobacco rod 3. Reconstituted tobacco sheets may be produced, for example, by a paper making process, band casting or extrusion. For example, the reconstituted tobacco sheet may be paper reconstituted tobacco. Paper reconstituted tobacco refers to tobacco material formed by a process in which tobacco feedstock is extracted with a solvent to afford an extract of solubles and a residue comprising fibrous material, and then the extract (usually after concentration, and optionally after further processing) is recombined with fibrous material from the residue (usually after refining of the fibrous material, and optionally with the addition of a portion of non-tobacco fibres) by deposition of the extract onto the fibrous material. The process of recombination resembles the process for making paper. The feedstock may comprise or consist of one or more of tobacco strips, tobacco stems, and/or whole leaf tobacco. Scraps, fines and winnowings may alternatively or additionally be employed in the feedstock. It will be appreciated that reconstituted tobacco sheet formed by any process may be used. The reconstituted tobacco sheet is malleable.

Referring to FIGS. 1A and 1B, the tobacco strands 2 in the tobacco rod 3 extend in a direction of a length of the tobacco rod 3, wherein each of the plurality of longitudinal strands 2 are substantially non-coiled. The plurality of tobacco strands 2 are substantially parallel to one another, substantially straight, and each extend along substantially the entire length of the tobacco rod segment 1.

The wrapper 4 circumscribing the tobacco strands 2 is preferably made of paper. The wrapper 4 may, for example, be or comprise one or both of paper and aluminium foil, for example a laminate of paper and aluminium foil. The wrapper 4 may have a glued seam that secures the wrapper 4 about the tobacco rod 3.

As described in further detail hereinafter, a process for producing the tobacco rod segments 1 can include slitting a reconstituted tobacco sheet into tobacco strands 2, grouping together the tobacco strands 2, wrapping the tobacco strands 2 in a wrapper 4 to form a continuous tobacco rod, and then cutting the continuous tobacco rod into discrete tobacco rod segments 1. The step of grouping together the tobacco strands 2 can be performed on a conveyor, and such a conveyor is described in detail hereinafter.

Heating the tobacco strands 2 can release an aerosol for inhalation by a user. The tobacco rod segments 1 can be used with an aerosol-generating device that includes a heating blade 5. The heating blade 5 can be inserted into an end 6 of the tobacco rod segment 1, between tobacco strands 2, as shown in FIGS. 1A and 1B.

The reconstituted tobacco sheet used to produce the tobacco strands 2 may comprise glycerol. For example, the reconstituted tobacco sheet may be impregnated or otherwise formed with glycerol. When heated, the glycerol may be volatilised to form an aerosol, which may enhance user experience of an aerosol-generating device, or any suitable "heat not burn" device, with which the tobacco rod segment 1 may be used.

The blade heater 5 can take the form of an elongate cuboid that is significantly thinner than it is wide or long. The width of the blade heater 5 is less than the outer diameter of the tobacco rod segment 1. The blade heater 5 may comprise a resistive heater (not shown) powered by a battery (not shown) of a hand-held aerosol generating device (not shown) and which is controllable by a user to heat up. In some examples, the blade heater 5 may have a pointed end (not shown) so as to facilitate insertion of the blade heater 5 into the tobacco rod segment 1.

The blade heater 5 may be inserted into the tobacco rod segment 1, or equally the tobacco rod segment 1 may be pushed over the blade heater 5, so that the blade heater 5 extends longitudinally into the tobacco rod segment 1 as shown in FIG. 1B.

The plurality of longitudinally extending tobacco strands 2 of the tobacco rod segment 1 being substantially non-coiled allows the blade heater 5 to be easily inserted into the tobacco rod segment 1. This is because the non-coiled tobacco strands 2 present relatively little resistance to longitudinal insertion of the blade heater 5. This may provide for convenient installation or replacement of the tobacco rod segment 1 onto to the blade heater 5, which tobacco rod segment 1 may be a consumable of the overall aerosol generating device (not shown). This may reduce damage to the tobacco rod segment 1 on insertion of the blade heater 5, and allow for more consistent and correct placement of the tobacco rod segment 1 relative to the blade heater 5. This may be contrasted, for example, with a hypothetical tobacco rod segment comprising longitudinal strands that are coiled, for example arranged in a helical structure: in this case insertion of the blade heater would be restricted by strands crossing the insertion path, and the blade heater may deform and compress portions of the tobacco, which may lead to relatively difficult and inconsistent placement of the hypothetical tobacco rod segment, and may result in an increased risk of damaging the hypothetical tobacco rod segment.

The plurality of longitudinally extending tobacco strands 2 of the tobacco rod segment 1 being parallel to one another and/or straight similarly allows the blade heater 5 to be easily inserted into the tobacco rod segment 1. In this case, the axis of insertion of the blade heater 5 is parallel to the axis of each of the longitudinal strands 2, and only a small surface area of tobacco is presented to the leading edge of the blade heater 5 as it is inserted. Similarly to as mentioned above, this may provide for convenient installation or replacement of the tobacco rod segment 1 and/or reduce damage to the tobacco rod segment 1, and/or provide for more consistent and correct placement of the tobacco rod segment 1 relative to the blade heater 5. This may be contrasted, for example, with a hypothetical tobacco rod segment comprising randomly oriented shreds of cut rag tobacco, or comprising crimped or corrugated sheets of tobacco: in this case insertion of a blade heater may deform and compress portions of the cut rag tobacco or edges of the crimped or corrugated sheets of tobacco, which may lead to relatively difficult and inconsistent placement of the hypothetical tobacco rod segment, and may result in an increased risk of damaging the hypothetical tobacco rod segment.

Once the tobacco rod segment 1 is inserted over the blade heater 5 of the overall aerosol generating device (not shown), the blade heater 5 may be controlled to heat up (for example via resistive heating internal of the blade heater), and thereby to heat, but not burn, the tobacco strands 2. This may release constituents, for example volatile constituents, from the tobacco strands 2. As mentioned above, the tobacco strands 2 may comprise glycerol, which may be volatilised when heated by the blade heater 5 to form an aerosol.

The plurality of substantially non-coiled longitudinal tobacco strands 2 of the tobacco rod segment 1 establish a corresponding plurality of substantially non-coiled longitudinal pathways 7 through the tobacco rod segment 1, in between the plurality of tobacco strands 2. These pathways 7 facilitate the transport of volatile materials released from the tobacco strands 2 on heating (for example volatile constituents of the tobacco itself or volatilised glycerol or both) through the tobacco rod segment 1. This may reduce the losses of such materials as they pass through the tobacco rod segment 1, for example the relatively short and uninterrupted pathways may reduce occurrences of condensation of the volatile materials back onto portions of the tobacco rod segment 1. This may be contrasted for example, with a hypothetical tobacco rod segment comprising randomly oriented shreds of cut rag tobacco (such as in standard cigarettes), in which the path length for volatilised materials to exit the hypothetical tobacco rod is relatively long. This may also be contrasted with a hypothetical tobacco rod segment comprising a plurality of coiled longitudinal strands, in which the path length for volatilised materials to exit the hypothetical tobacco rod is also relatively long.

As described above, the wrapper 4 may, for example, be or comprise one or both of paper and aluminium foil, for example a laminate of paper and aluminium foil. The laminate of paper and aluminium foil may be useful to prevent the tobacco rod segment 1 from being ignited by the blade heater 5. The aluminium foil may also be useful to prevent a consumer from igniting a tobacco rod segment 1 like a conventional cigarette when the tobacco rod segment 1 is intended for use with a heating device.

Each of the plurality of tobacco strands 2 may have a width substantially in the range 0.25 mm to 3 mm, or substantially in the range 0.5 mm to 1.5 mm. The tobacco rod segment 1 may have an outer diameter substantially in the range 5.4 mm to 7.8 mm, or substantially in the range 6.7 mm to 7.8 mm. This may allow the use of a relatively large blade heater 5, hence increasing the heating surface area of the blade heater 5, hence increasing the rate at which the tobacco strands 2 may be heated and/or the amount of tobacco strands 2 that may be heated by the blade heater 5.

Figure 2:
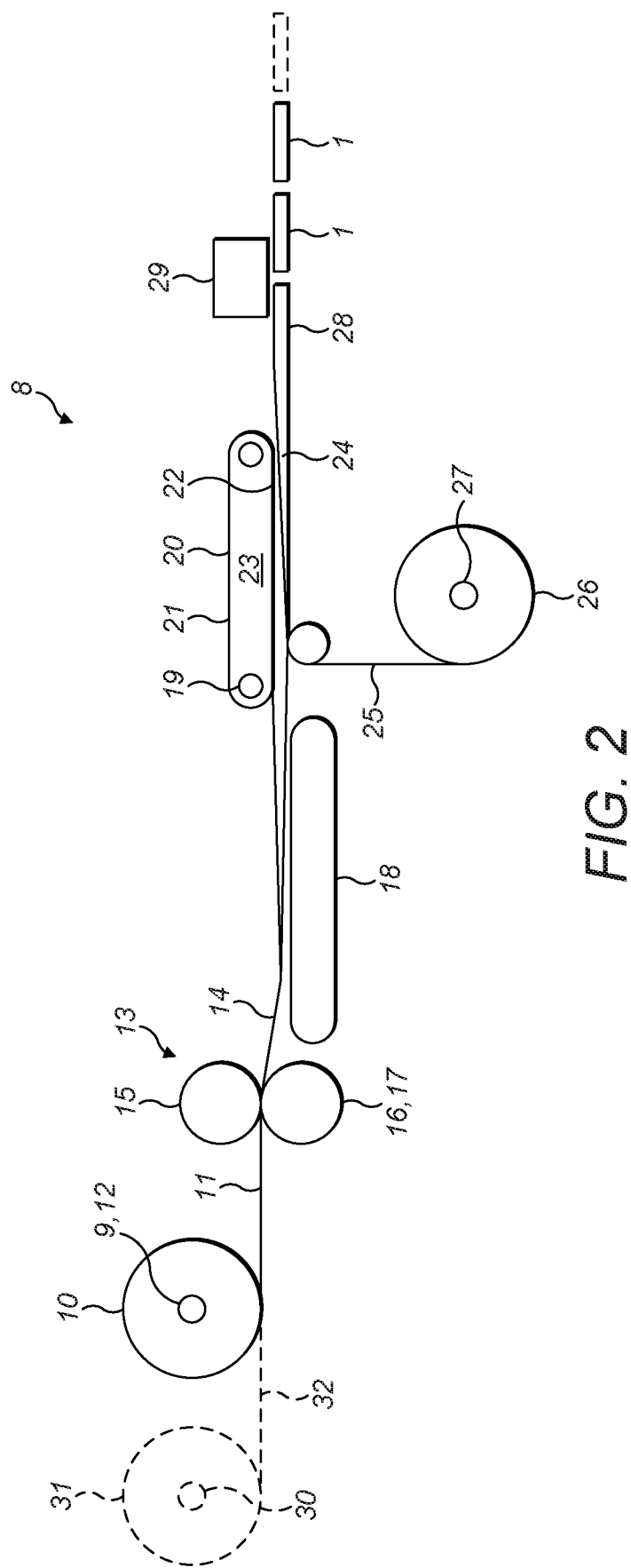
FIG. 2 shows a schematic diagram of apparatus for producing tobacco rod segments.

FIG. 2 schematically illustrates apparatus 8 for producing rods of aerosol-generating material, in particular the tobacco rod segments 1 described with reference to FIGS. 1A and 1B.

The reconstituted tobacco sheet used to produce the tobacco strands 2 is provided to the apparatus 8 in a reel 10. The apparatus 8 includes a reel support 9 for receiving a reel 10 of reconstituted tobacco. The reel 10 of reconstituted tobacco is unwound to provide a tobacco web 11. The reel support 9 includes a spindle 12 on which the reel 10 of reconstituted tobacco is supported. The reel support 9 preferably includes a drive, for example a motor, that rotates the spindle 12 to drive the tobacco web 11 into the apparatus 8. Alternatively or additionally, a drive roller may engage an outer surface of the reel 10 to rotate the reel 10, thereby feeding the tobacco web 11 into the apparatus 8. Alternatively, the spindle 12 may be freely rotatable such that the tobacco web 11 can be unwound by pulling the tobacco web 11 off of the reel 10 of reconstituted tobacco. The tobacco web 11 can be pulled by a part of the apparatus 8 located downstream of the reel support 9. The spindle 12 may be braked to create and/or control tension in the tobacco web 11.

The tobacco web 11 is of known dimensions. For example, the width and thickness of the tobacco web 11 fed from the reel 10 may be constant and known. For example, the tobacco web 11 may be of a given and constant mass per unit length. This may ensure that the tobacco rod segments 1 produced are of consistent weight per unit length. Using a tobacco web 11 of known (and constant) dimensions therefore allows weight control of the resulting tobacco rod segments 1 without the need for weighing systems for weighing the tobacco rod or tobacco rod segments 1.

The tobacco web 11 is fed into a slitting unit 13 that slits the tobacco web 11 into a plurality of tobacco strands 14. The slitting unit 13 slits the tobacco web 11 longitudinally to produce longitudinally extending tobacco strands 14.

In one example, the slitting unit 13 comprises a cutting roller 15 and an anvil roller 16. The cutting roller 15 includes an array of circumferential cutting blades that cut the tobacco web 11 as it is passed between the cutting roller 15 and the anvil roller 16. Alternatively, the slitting unit 13 may comprises a first cutting roller 15 and a second cutting roller 17, each having an array of circumferential cutting blades that cooperate to slit the tobacco web 11. For example, the circumferential cutting blades of the first cutting roller 15 may closely overlap with the circumferential cutting blades of the second cutting roller 17 to shear cut the tobacco web 11 into tobacco strands 14.

The array of circumferential cutting blades on the or each cutting roller 15, 17 determines the number of tobacco strands 14 and the size of the tobacco strands 14. The tobacco strands 14 are preferably all equal in width. The array of circumferential cutting blades on the or each cutting roller 15, 17 may be arranged such that each tobacco strand 14 has a width substantially in the range 0.25 mm to 3 mm, or substantially in the range 0.5 mm to 1.5 mm. This would correspond, for example, to the circumferential cutting blades being spaced apart by substantially 0.25 mm to 3 mm, or substantially 0.5 mm to 1.5 mm, respectively.

The distance between the cutting roller 15 and the anvil roller 16, or between the first cutting roller 15 and the second cutting roller 17, may be fixed. Alternatively, one of the cutting roller 15 and the anvil roller 16, or one of the first cutting roller 15 and the second cutting roller 17, may be slidably mounted, and an actuator may be arranged to apply hydraulic or pneumatic pressure between the cutting roller 15 and the anvil roller 16, or between the first cutting roller 15 and the second cutting roller 17.

From the output of the slitting unit 13 the tobacco strands 14 are passed onto a conveyor 18, which is described in more detail with reference to FIGS. 3 to 7. The conveyor 18 is configured to convey the tobacco strands 14. Preferably, the tobacco strands 14 are grouped together as they are conveyed along the conveyor 18, as described further hereinafter.

The grouped together tobacco strands 14 at the output of the conveyor 18 are passed onto a suction conveyor 19, illustrated in FIG. 2. The suction conveyor 19 includes a suction band 20. The suction band 20 is driven to move along an upper run 21 and a lower run 22. A suction chamber 23 is provided between the upper run 21 and the lower run 22, and suction applied to the suction chamber 23 acts through suction holes formed in the suction band 20. Suction acts through the suction holes in the suction band 20 only on the lower run 22, because the suction chamber 23 is closed to the upper run 21.

The suction conveyor 20 is arranged to retain the tobacco strands 14 on the lower run 22 of the suction band 20. The suction conveyor 20 conveys the tobacco strands 14 through a garniture 24, as illustrated.

A wrapper web 25 is input into the garniture 24 from a reel 26 of wrapper that is supported on a wrapper reel support 27.

The garniture 24 receives the tobacco strands 14 and the wrapper web 25, and as the tobacco strands 14 and the wrapper web 25 are conveyed along the suction conveyor 19 the garniture 24 wraps the wrapper web 25 about the tobacco strands 14. An adhesive unit is arranged to apply adhesive along one edge of the wrapper web 25 to form a longitudinal seam joining one edge of the wrapper web 25 to the other. In this way, a continuous tobacco rod 28 is produced. The continuous tobacco rod 28 has a group of longitudinal tobacco strands 14 surrounded by a wrapper.

The suction conveyor 19 and the garniture 24 are similar to apparatus used in the manufacture of tobacco rods for use in cigarettes, and so the skilled person will be familiar with the details of the suction conveyor 19 and the garniture 24, and further description is omitted herefrom.

A cutting unit 29 is arranged downstream of the suction conveyor 19 and the garniture 24 to cut the continuous tobacco rod 28 into discrete tobacco rod segments 1, each tobacco rod segment 1 being as described with reference to FIGS. 1A and 1B.

In some examples, the cutting unit 29 cuts the continuous tobacco rod 28 into double-length discrete tobacco rods 1, i.e. two discrete tobacco rods 1 joined end-to-end. For example, the double-length discrete tobacco rods 1 may then be passed onto subsequent apparatus that combines the double-length discrete tobacco rods 1 with other components, for example filters and/or mouthpieces. The subsequent apparatus can also cut the double-length discrete tobacco rods 1 into single-length discrete tobacco rods 1 as described with reference to FIGS. 1A and 1B.

Alternatively or additionally, the discrete tobacco rod segments 1 can be onwardly conveyed to packaging apparatus that packages the tobacco rod segments 1 for sale, distribution and/or storage.

As shown in FIG. 2, in some examples a second reel support 30 is provided to support a second reel 31 of reconstituted tobacco. The second reel support 30 is similar or identical to the reel support 9 described previously. The second reel 31 of reconstituted tobacco is arranged to provide a second tobacco web 32 into the apparatus 8, the tobacco web 11 and second tobacco web 32 being arranged to overlie each other. In this way, the apparatus 8 is provided with a double-thickness tobacco web, thereby providing a higher density of tobacco strands 14 at output from the slitting unit 13. This arrangement may be preferable if it desired that the individual tobacco strands 14 are particularly thin or low density as it provides for each tobacco rod segment 1 to have twice as many tobacco strands 14. In addition, for the same number of tobacco strands 14, the width of the combined tobacco web 11 and the second tobacco web 32 would be less than the width of a similar thickness single tobacco web 11. Therefore, the tobacco strands 14 producing from overlapping tobacco webs 11, 32 would need less lateral movement to be grouped into a tobacco rod 3, which may be preferable.

Furthermore, providing a second tobacco web 32 means it is possible to provide two different types of tobacco strands 14 in a tobacco rod segment 1. For example, one type (e.g. the tobacco web 11) can have a high glycerol content to generate significant aerosol or vapour, and the other type (e.g. the second tobacco web 32) can include a flavour that is delivered with the aerosol or vapour. In this way, different tobacco rod segments 1 can be made by combining different reels.

Figure 3:
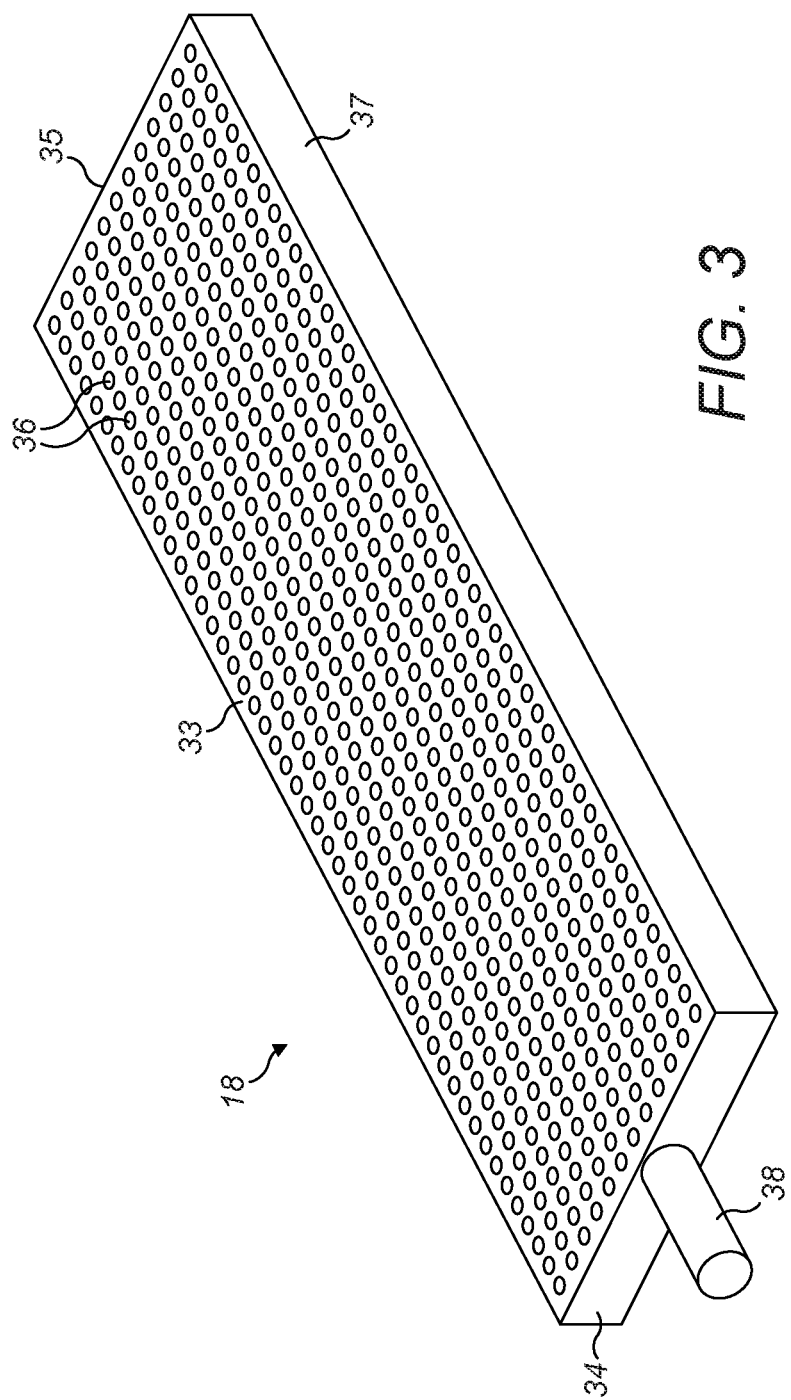
FIG. 3 shows a part of conveyor of the apparatus of FIG. 2.

FIG. 3 shows a part of the conveyor 18 described with reference to FIG. 2. The conveyor 18 receives the tobacco strands 14 at output from the slitting unit 13, and conveys the tobacco strands 14 to the suction conveyor 19. Preferably, the tobacco strands 14 are grouped together as they are conveyed along the conveyor 18.

After being slit the tobacco strands 14 are relatively delicate and any significant pulling force could break them. It is preferable if the tobacco strands 14 remain as intact as possible through the remainder of the apparatus 8 as it is easier to control their position and direction. The conveyor 18 is arranged to receive the tobacco strands 14 from the slitting unit 13, and to convey the tobacco strands 14 without application of significant forces. The tobacco strands 14 are pushed along the conveyor 18 by the slitting unit 13, and/or the tobacco strands 14 are gently pulled by the suction conveyor 19. The conveyor 18 preferably applies minimal friction and drag to reduce the forces placed on the tobacco strands 14.

Referring to FIG. 2 and FIG. 3, the conveyor 18 comprises an upstream end 34 disposed proximate to the slitting unit 13, and a downstream end 35 disposed proximate to the suction conveyor 19. The tobacco strands 14 are conveyed from the upstream end 34 to the downstream end 35 over a conveying surface 33. The conveying surface 33 includes to a plurality of openings 36 arranged in an array. An air flow generator (not shown) is arranged to generate air flow through the openings 36 so that an air cushion is provided between the conveying surface 33 and the tobacco strands 14.

In this example the conveyor 18 comprises a box 37 having six sides, the top side defining the conveying surface 33. The interior of the box 37 is hollow and an air inlet 38 is arranged on one side of the box 37 for providing an air flow from an air flow generator (not shown). As mentioned above, the conveying surface (top side of the box 37) has an array of openings 36 through which air flows during use to provide an air cushion for conveying the tobacco strands.

The air cushion reduces friction and drag on the tobacco strands 14 by minimising or eliminating any force between the tobacco strands 14 and the conveying surface 33. The air cushion may lift the tobacco strands 14 away from the conveying surface 33 such that there is a gap between the tobacco strands 14 and the conveying surface 33.

Figure 4:
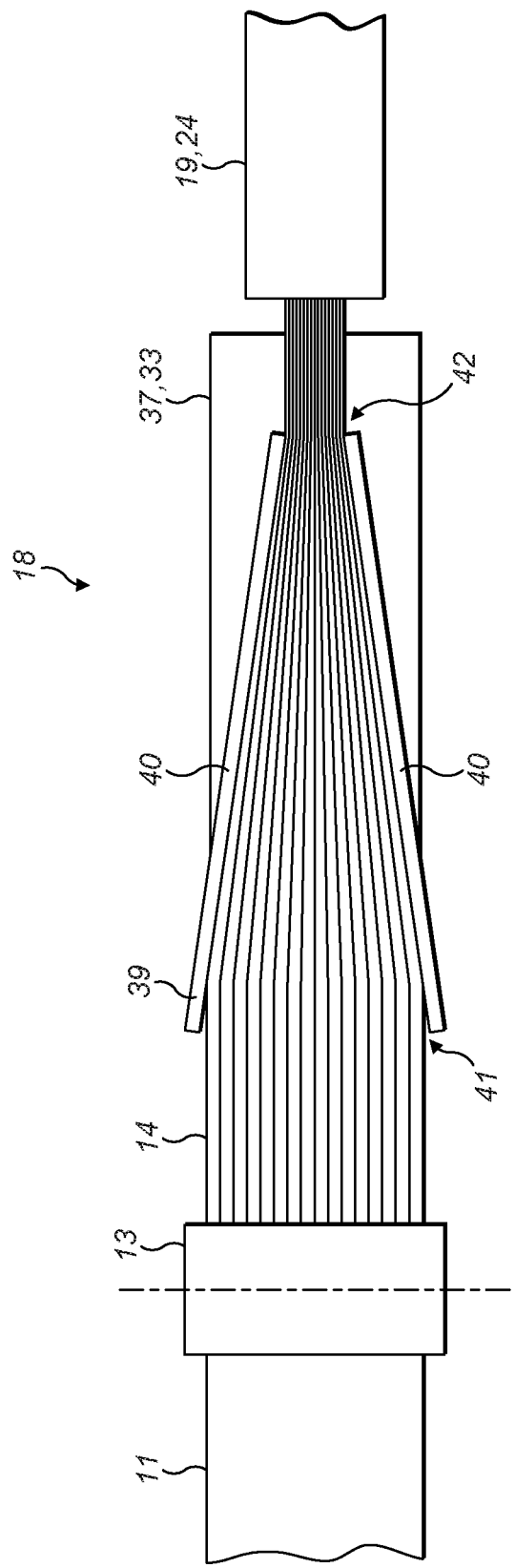
FIG. 4 shows an example of the conveyor of the apparatus of FIG. 2, including a guide.

Referring to FIGS. 2 and 4, at output from the slitting unit 13 the tobacco strands 14 are arranged in a row. As explained previously, it may be preferable to maintain the tobacco strands 14 in an arrangement where they are parallel to each other, overlapping each other, but with minimal twisting, so that the tobacco strands 14 in the resulting tobacco rod segments 1 are arranged as neatly as possible, permitting easier entry of the heating blade 15 and better flow of vapour and aerosol along the tobacco rod segments 1.

To move the tobacco strands 14 into a group ready to be wrapped, preferably the conveyor 18 includes a guide 39. The guide 39 deflects the path of the tobacco strands 14 such that they are grouped more narrowly together, in line with an axis of the suction conveyor 19 and garniture 24 (see FIG. 2).

FIG. 4 shows a first example of the guide 39. In this example, the conveyor 18 includes a pair of rails 40 angled towards each other to group together the tobacco strands 14. The pair of rails 40 are arranged as a funnel, with a wider inlet 41 disposed towards the slitting unit 13 and a narrower outlet 42 disposed towards the suction conveyor 19. The pair of rails 40 move the outer lying tobacco strands 14 towards the middle of the conveyor 18 to group them together. The angle of the pair of rails 40 relative to the conveying direction of the tobacco strands 14 can be selected such that the forces placed on the tobacco strands 14 are acceptable—a lower angle of rail 40 will result in lower forces being applied to the tobacco strands 14.

Once the grouped together tobacco strands 14 are transferred to the suction conveyor 19 the suction applied to the tobacco strands 14 through the suction band (20, see FIG. 2) maintains the arrangement of the tobacco strands 14 until they are wrapped in the garniture 24.

FIGS. 5A, 5B, 5C and 5D illustrate, from the position of the slitting unit 13, different examples of the guide 39. In each of these examples the guide 39 comprises a pair of rails 40 arranged to group together the tobacco strands 14 as they are conveyed over the conveying surface 33, as illustrated in FIG. 4. Each rail 40 has a guiding surface 43 that is disposed towards the tobacco strands 14, and the tobacco strands 14 engage the guiding surface 43 during operation of the apparatus 8.

Figure 5A:
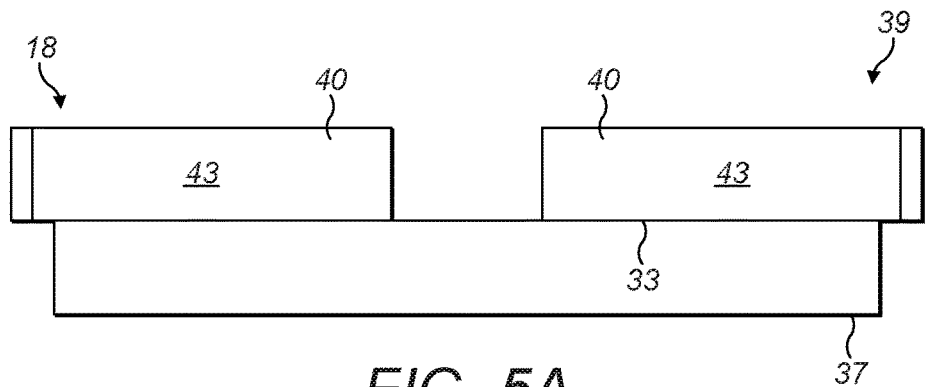
FIGS. 5A to 5D show various examples of the guide of FIG. 4.

In the example of FIG. 5A, the guiding surfaces 43 of the pair of rails 40 are flat and arranged substantially perpendicularly to the conveying surface 33. As the tobacco strands 14 are conveyed across the conveying surface 33 the rails 40 push the outer tobacco strands 14 towards the middle, thereby grouping them together.

Figure 5B:
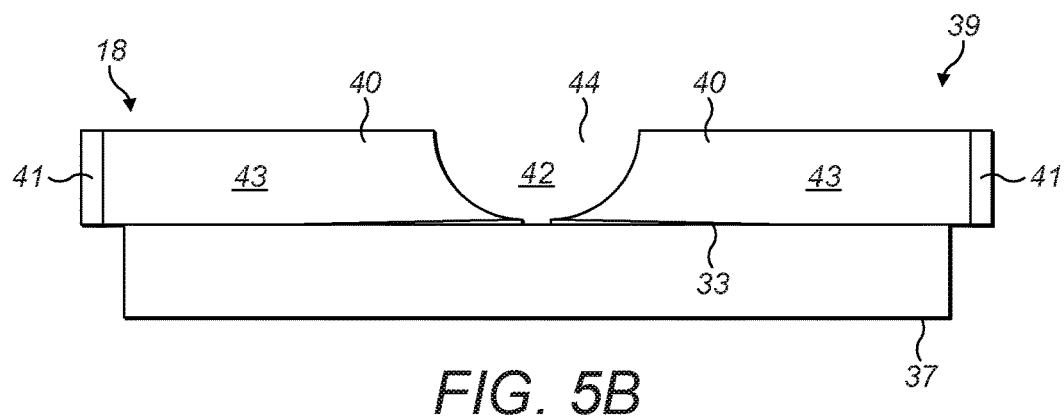

In the example of FIG. 5B, the pair of rails 40 change shape along the length of the conveyor, in particular the guiding surfaces 43 change shape. At the inlet 41 of the guide 39, towards the slitting unit 13, the guiding surfaces 43 of the pair of rails 40 are flat and arranged substantially perpendicularly to the conveying surface 33. At the outlet 42 of the guide 39, towards the suction conveyor 19, the guiding surfaces 43 are curved. In this way, the outlet 42 of the guide 39 is shaped as a curved channel 44 and the grouped together tobacco strands 14 adopt a similar shape. This may be advantageous for entry into the garniture (24, see FIG. 2).

Figure 5C:
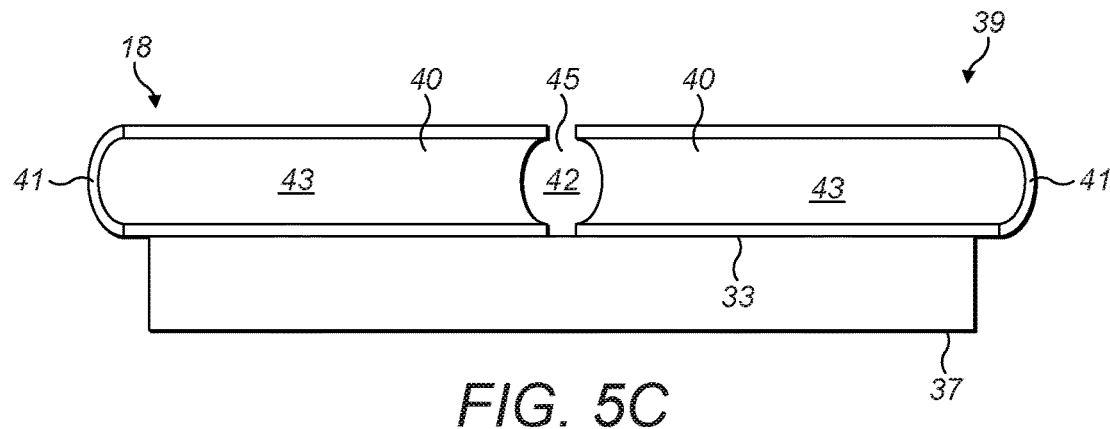

In the example of FIG. 5C the guiding surfaces 43 of the pair of rails 40 are curved outwards along their entire length, so that the guiding surfaces 43 are concave towards the tobacco strands 14. The concave guiding surfaces 43 define a substantially circular or oval shaped channel 45 at the outlet 42 of the guide 39, through which the tobacco strands 145 are conveyed. In this way, the grouped together tobacco strands 14 adopt a similar shape. This may be advantageous for entry into the garniture (24, see FIG. 2).

Figure 5D:
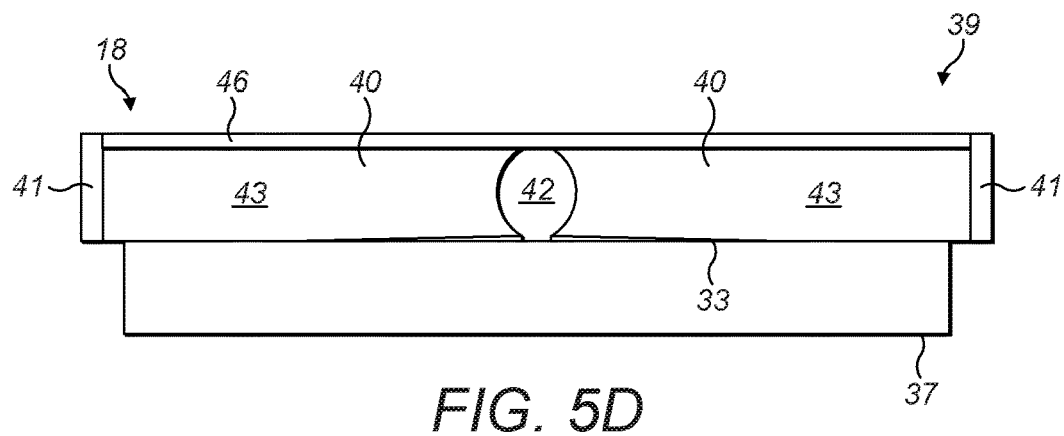

In the example of FIG. 5D, the guide 39 includes a cover 46, which closes the top of the guide 39 at least at the outlet 42, as shown further in FIG. 6. In this example, the pair of rails 40 change shape along the length of the conveyor 18, in particular the guiding surfaces 43 change shape. At the inlet 41 of the guide 39, towards the slitting unit 13, the guiding surfaces 43 of the pair of rails 40 are flat and arranged substantially perpendicularly to the conveying surface 33. At the outlet 42 of the guide 39, towards the suction conveyor 19, the guiding surfaces 43 are curved outwardly, defining a concave guiding surface 43. In this way, the outlet 42 of the guide 39 is shaped as a circular or oval channel 45 similar to that of FIG. 5C, and the grouped together tobacco strands 14 adopt a similar shape. This may be advantageous for entry into the garniture (24, see FIG. 2).

It will be appreciated that the cover 46 may be omitted from the guide 39 of FIG. 5D. Also, in alternative examples a cover 46 can be provided on any of the other examples of the guide 39 described with reference to FIGS. 5A to 5C.

Figure 7A:
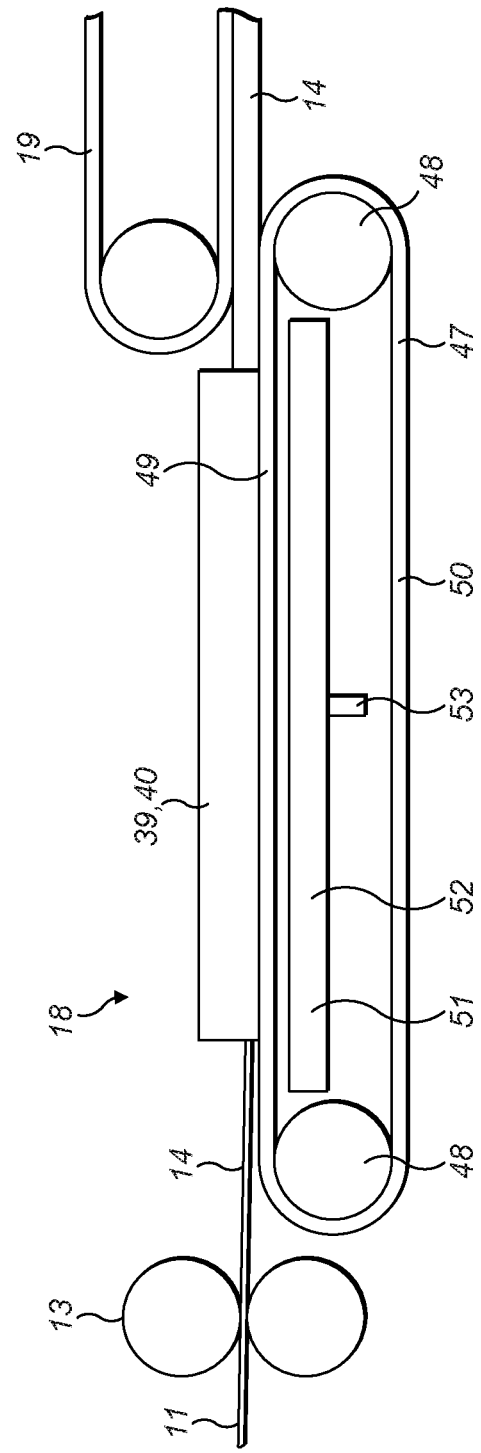
FIGS. 7A and 7B show an alternative conveyor for the apparatus of FIG. 2.
Figure 7B:
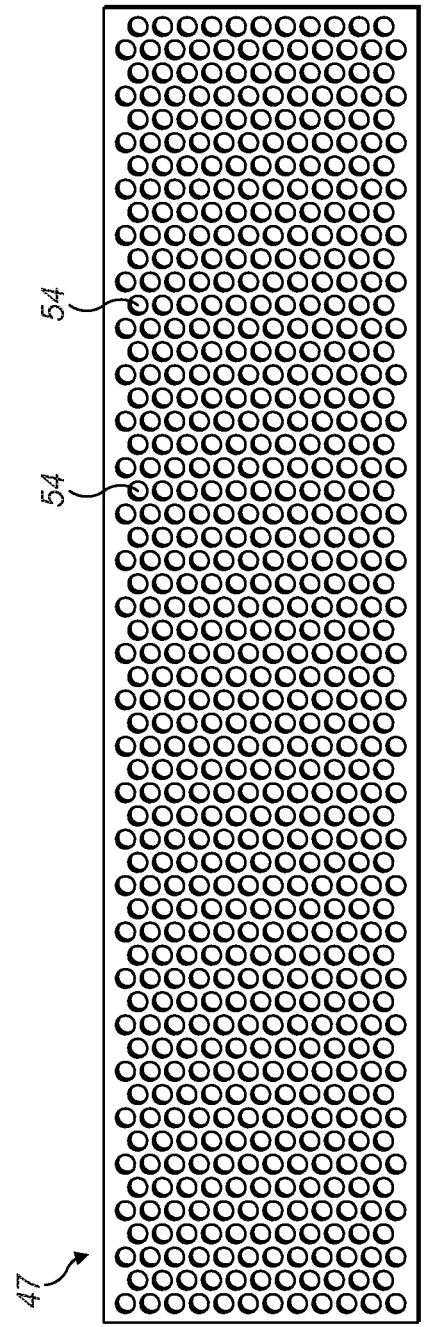

FIGS. 7A and 7B show an alternative conveyor 18 that includes a moving conveying belt 47. In particular, as shown in FIG. 7A, the conveyor 18 disposed between the slitting unit 13 and the suction conveyor 19 includes a perforated conveyor belt 47, as shown in FIG. 7B. The perforated belt 47 has an array of openings or perforations 54 along its entire length.

The perforated belt 47 is driven to run over two rollers 48 to define an upper run 49 and a lower run 50. The outer surface of the upper run 49 of the perforated belt 47 is the conveying surface. The conveyor belt 47 is driven to move at the same speed as the tobacco strands 14 are conveyed through the apparatus 8.

Between the upper run 49 and the lower run 50 of the perforated belt 47 is an air flow generator 51, or part of an air flow generator, in this example a chamber 52. The chamber 52 is open to, and disposed proximate to, the underside of the upper run 49 of the perforated belt 47. The chamber 52 includes air inlet 53 for connection to the remainder of the air flow generator, for example a pump or compressor. In this way, air flow into the chamber 52 passes through the perforations 54 in the perforated belt 47 and generates an air cushion between the perforated belt 47 and the tobacco strands 14.

By providing a moving conveying surface (i.e. the perforated belt 47), stresses and strains in the tobacco strands 14 can be further reduced. In addition, there may be less need to use the slitting unit 13 to push the tobacco strands 14 over the conveyor 18, and/or to use the suction conveyor 19 to pull the tobacco strands 14 over the conveyor 18.

As shown in FIG. 7A, the guide 39, and the various examples of the guide described above with reference to FIGS. 4 to 6, can still be used on the conveyor 18 of FIGS. 7A to 7B.

In some examples, the guide 39 can extend onto the suction conveyor 19. In other examples, the suction conveyor 19 can include its own guide, including oppositely arranged rails that hold the tobacco strands 14 in a group until they are wrapped in the garniture 24.

Figure 8A:
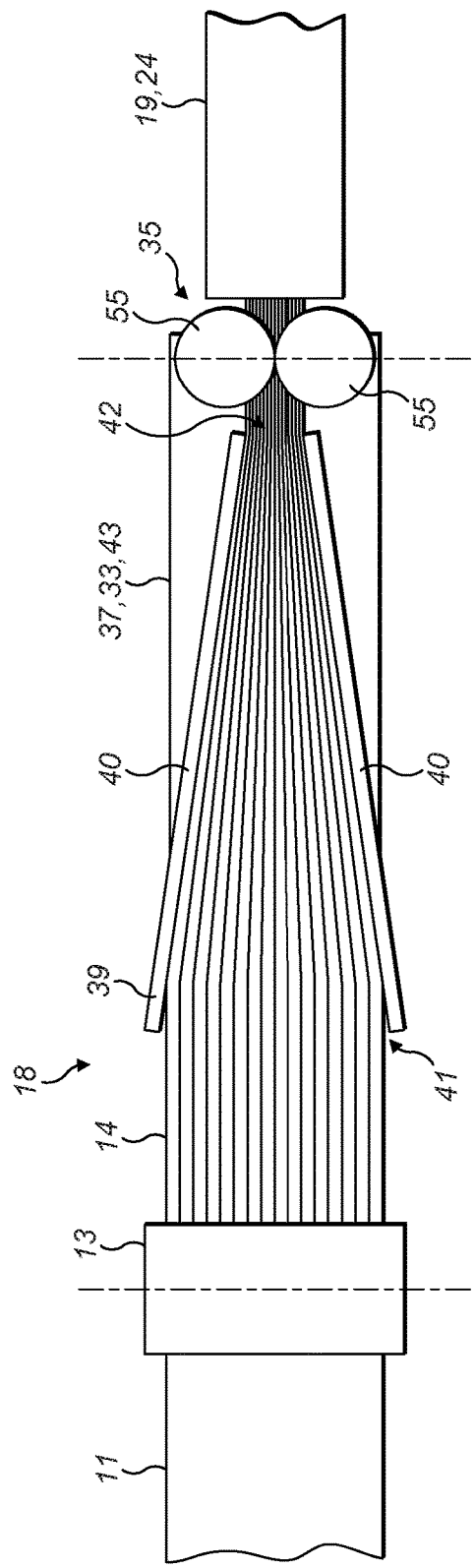
FIGS. 8A and 8B show a pair of forming rollers with the conveyor of the apparatus of FIG. 2.
Figure 8B:
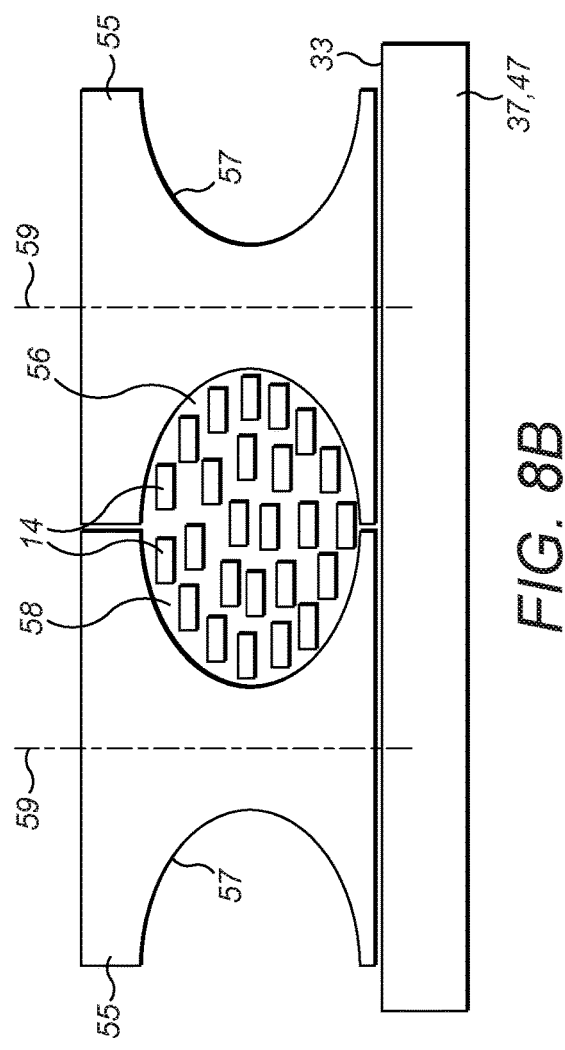

FIGS. 8A and 8B show a further example of the conveyor 18, which includes a pair of forming rollers 55. The conveyor 18 may be the conveyor 18 described with reference to FIG. 3, or the conveyor 18 described with reference to FIGS. 7A or 7B. The conveyor 18 of this example may optionally include a guide 39, such as any of the example guides 39 described with reference to FIGS. 4 to 6.

As illustrated, in this example a pair of forming rollers 55 are disposed towards the downstream end 35 of the conveyor 18 proximate to the suction conveyor 19. If a guide 39 is included, as shown, the forming rollers 55 are positioned at the outlet 42 of the guide 39. FIG. 8B shows cross-section A-A, through the pair of forming rollers 55 as shown in FIG. 8A.

The pair of forming rollers 55 are arranged on either side of the grouped tobacco strands 14 and act to form the tobacco strands 14 into a cylindrical group, i.e. a group 56 having a substantially circular cross-section as shown in FIG. 8B. Each of the forming rollers 55 comprises an inwardly curved forming surface 57 so that the pair of forming rollers 55 cooperate to define a substantially circular or oval channel 58 through which the tobacco strands 14 pass, and that forms the group 56 of tobacco strands 14. Counter-rotation of the pair or forming rollers 55 about the axes 59 can reduce the forces placed on the tobacco strands 14 and help to move the tobacco strands 14 into the desired group 56.

In further examples, more than one pair of forming rollers 55 may be provided. For example, an upstream pair of forming rollers (not illustrated) having a larger opening may be positioned upstream of the pair of forming rollers 55 illustrated in FIGS. 8A and 8B. In this way, the tobacco strands 14 can be gradually moved into the desired group 56 by the two pairs of forming rollers 55.

In some examples, the conveyor 18 includes a pair of forming rollers 55 and no guide 39. In other examples, the conveyor 18 includes a guide 39 and no forming rollers 55. In other examples, the conveyor 18 includes both a guide 39 and forming rollers 55.

The above examples are to be understood as illustrative examples of the invention.

For example, although in the above examples the tobacco web 11 is described as being a sheet of reconstituted tobacco, this need not necessarily be the case, and in other examples, the tobacco web 11 may be made of other materials. The tobacco web 11 may or may not comprise glycerol, and may comprise other materials, such as additives or enhancers, alternatively or additionally to glycerol.

Although in the above examples the tobacco strands 14 are described as being straight and parallel to one another, this need not necessarily be the case, and in other examples the tobacco strands 14 may not be substantially straight and/or may not be substantially parallel to one another. For example, the tobacco strands 14 may undergo processing so as to comprise a longitudinal wave or corrugation or zig-zag shape or the like, or indeed the tobacco web 11 may inherently comprise a longitudinal wave or corrugation or zig-zag shape or the like or be processed so as to have such a shape or configuration. Indeed, the tobacco rod segment 1 may comprise any tobacco rod 3 formed of a plurality of longitudinal tobacco strands 14, wherein each of the plurality of longitudinal tobacco 14 strands are substantially non-coiled.

Although in some of the above examples the tobacco rod segment 1 is described as being a consumable for a "heat-not-burn" device or the like comprising a blade heater 15, this need not necessarily be the case, and in other examples the tobacco rod segment 1 may be used in other devices and/or for other purposes. For example, the tobacco rod segment 1 may be a consumable of any aerosol generating device, for example tobacco heating products or devices not necessarily comprising a blade heater 15.

Although in the above examples the tobacco web 11 is described as being or comprising tobacco, for example reconstituted tobacco, this need not necessarily be the case and in other examples the sheet may be or comprise a sheet of any aerosol-generating material. The aerosol-generating material may be a material which when heated, for example by the blade heater 15 of an overall aerosol generating device, produces an aerosol. For example, the sheet of aerosol generating material may be or comprise a flavour substrate. The flavour substrate may comprise flavour, such as tobacco flavour or other flavour and/or may comprise glycerol or other additives or enhancers alternatively or additionally to glycerol. The flavour substrate, with or without glycerol or other additives, may be heated to produce an aerosol.

It may be noted that, in general, an aerosol is a colloid of fine solid particles or liquid droplets, in air or another gas, where a colloid is a substance in which microscopically dispersed insoluble particles are suspended throughout another substance. On the other hand, a vapour is a substance in the gas phase at a temperature lower than its critical temperature, which means that for example the vapour can be condensed to a liquid by increasing its pressure without reducing the temperature. It is to be understood that as used herein the term aerosol includes aerosol and/or vapour.

It will be appreciated that in some examples, aerosol-generating material rod segments may be made from a web of aerosol-generating material, as described above for a reconstituted tobacco web, for example by cutting the sheet of aerosol-generating material longitudinally to produce a plurality of aerosol-generating material strands; gathering the strands together to form an aerosol-generating material rod in which each of the plurality of aerosol-generating material strands is substantially non-coiled; and cutting the aerosol-generating material rod into segments to produce the aerosol- generating material rod segments.

Similarly, it will be appreciated that a product may comprise a rod of aerosol-generating material, wherein the rod of aerosol-generating material is formed of a plurality of longitudinal strands of aerosol-generating material, wherein each of the plurality of longitudinal strands of aerosol-generating material is substantially non-coiled.

As used herein, the terms "upstream" and "downstream" refer to a position within the apparatus relative to the direction that the aerosol-generating material moves through the apparatus. Therefore, "upstream" refers to a position in the direction of the reel of tobacco web, and "downstream" refers to a position in the direction of the cutting unit, as illustrated in FIG. 2.

In order to address various issues and advance the art, the entirety of this disclosure shows by way of illustration various embodiments in which the claimed invention(s) may be practiced and provide for superior conveyor for conveying strands of aerosol-generating material, and apparatus for producing rods of aerosol-generating material. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

The invention claimed is:

1. Apparatus for producing a rod of aerosol-generating material, the apparatus comprising a slitting unit arranged to slit a web of aerosol-generating material into a plurality of strands of aerosol-generating material, and a conveyor arranged to convey strands of aerosol-generating material received from the slitting unit, the conveyor comprising:
a conveying surface on which the strands of aerosol-generating material are conveyed, the conveying surface comprising a plurality of openings; and,
an air flow generator for generating a flow of air through the conveying surface, said air flow generator being configured so that said flow of air flows through said plurality of openings in a direction towards said strands of aerosol-generating material being conveyed on said conveying surface to provide an air cushion between the conveying surface and the strands of aerosol-generating material.

2. The conveyor of claim 1, further comprising a guide arranged to group together the strands of aerosol-generating material as the strands of aerosol-generating material are conveyed on the conveying surface.

3. The conveyor of claim 2, wherein the guide comprises a pair of rails angled towards each other to group together the strands of aerosol-generating material as the strands of aerosol-generating material are conveyed on the conveying surface.

4. The conveyor of claim 3, wherein each of the pair of rails comprises a guiding surface that engages the strands of aerosol-generating material.

5. The conveyor of claim 4, wherein the guiding surface of each rail comprises a flat surface.

6. The conveyor of claim 4, wherein the guiding surface of each rail comprises a curved surface, such that the pair of rails define a channel through which the strands of aerosol-generating material are conveyed.

7. The conveyor of claim 4, wherein the guiding surface of each rail comprises a flat surface at an upstream end of the conveying surface, and a curved surface at a downstream end of the conveying surface.

8. The conveyor of claim 7, wherein the curved surfaces of the pair of rails define a curved channel through which the strands of aerosol-generating material are conveyed.

9. The conveyor of claim 1, wherein the conveying surface is a stationary surface.

10. The conveyor of claim 1, further comprising a belt conveyor, and wherein the conveying surface is a surface of the belt conveyor.

11. The conveyor of claim 10, comprising a pair of rollers and a perforated belt being drivable on the rollers, the perforated belt comprising a plurality of openings and the conveying surface.

12. The conveyor of claim 1, further comprising a pair of forming rollers between which the strands of aerosol-generating material pass.

13. The conveyor of claim 12, wherein the forming rollers comprise concave forming surfaces.

14. The conveyor of claim 12 or claim 13, wherein the forming rollers are disposed at the downstream end of the conveyor.

15. The apparatus of claim 1, wherein the conveyor is arranged to receive the strands of aerosol-generating material directly from the slitting unit.

16. The apparatus of claim 1, further comprising a suction conveyor arranged to receive the strands of aerosol-generating material from the conveyor.

17. The apparatus of claim 16, wherein the suction conveyor comprises a suction belt having an upper run and a lower run, the suction belt being arranged to convey the strands of aerosol-generating material on a lower run of the suction belt.

18. The apparatus of any claim 16, further comprising a garniture configured to wrap a wrapper about the strands of aerosol-generating material to form a rod of aerosol-generating material.

19. The apparatus of claim 18, wherein the garniture is arranged on the suction conveyor.

20. The apparatus of claim 18, further comprising a cutting unit arranged to cut the rod of aerosol-generating material into discrete rods of aerosol- generating material.

* * * * *